US006859016B2

(12) United States Patent
    Dotzler

(10) Patent No.: US 6,859,016 B2
(45) Date of Patent: Feb. 22, 2005

(54) LITHIUM-ION BATTERY CHARGER INPUT PRE-REGULATOR

(75) Inventor: Kevin Dotzler, San Diego, CA (US)

(73) Assignee: Denso Corporation, Kariya (JP)

( * ) Notice: Subject to any disclaimer, the term of this patent is extended or adjusted under 35 U.S.C. 154(b) by 332 days.

(21) Appl. No.: 09/967,663

(22) Filed: Sep. 26, 2001

(65) Prior Publication Data

US 2003/0057920 A1 Mar. 27, 2003

(51) Int. Cl.$^7$ .................................................. H02J 7/24
(52) U.S. Cl. ....................................................... 320/164
(58) Field of Search ................................. 320/162, 164, 320/137, 152, 157, 158

(56) References Cited

U.S. PATENT DOCUMENTS 6,057,666 A  *  5/2000  Dougherty et al. ......... 320/162
6,097,351 A  *  8/2000  Nishida ....................... 345/1.3
6,118,254 A  *  9/2000  Faulk .......................... 320/128

\* cited by examiner

*Primary Examiner*—Pia Tibbits
(74) *Attorney, Agent, or Firm*—Harness, Dickey & Pierce, PLC

(57) ABSTRACT

A battery charger for charging a battery from a power source is provided. The battery charger includes a current sense circuit in series with the power source and the battery. A linear preregulator includes a first controlled switch coupled to the power source to generate a regulated output. The first controlled switch is responsive to a preregulator control signal, varying the first controlled switch impedance so that the regulated output is generated. A control circuit is powered by the preregulator regulated output. The control circuit generates the preregulator control signal and a charger control signal. A second controlled switch is coupled between the regulated output and the battery. The impedance of the second controlled switch is varied in response to the charger control signal so that a regulated flow of charge is supplied to the battery.

14 Claims, 5 Drawing Sheets

LITHIUM-ION BATTERY CHARGER INPUT PRE-REGULATOR

TECHNICAL FIELD

This invention relates to battery chargers, and more particularly to Lithium-Ion battery chargers.

BACKGROUND

Battery chargers can be classified into two general groups; linear regulator battery chargers and switching regulator battery chargers. Conventional linear regulator battery chargers typically employ single stage charge control with hardware-based voltage regulation. The use of hardware-based voltage-regulation limits the flexibility of the control scheme. For example, during input overvoltage conditions conventional chargers must be shutdown to protect the charging components from overdissipation. In addition, linear regulator battery chargers require an external current limit to protect the battery from a charger fault condition that could result in excessive current being supplied to the battery. The external current limit circuit generally requires tight voltage regulation to ensure that the current is limited to below a level that could damage the battery.

While conventional battery chargers can be used to charge batteries during normal operating conditions, they have proven to be deficient during abnormal operating conditions such as input overvoltage and battery overcurrent conditions.

SUMMARY

A battery charger for charging a battery from a power source is provided. The battery charger includes a current sense circuit in series with the power source and the battery. A linear preregulator generates a regulated output. The linear preregulator includes a voltage regulator circuit to generate a first control signal in response to a preregulator control signal. The preregulator also includes a first controlled switch coupled to the power source. The first controlled switch is responsive to the first control signal, varying the first controlled switch impedance so that the regulated output is generated. A charger regulator supplies a regulated flow of charge from the regulated output to the battery. The charger regulator includes a control circuit that is powered by the preregulator regulated output. The control circuit generates the preregulator control signal and a charger control signal. The charger regulator also includes a second controlled switch that in response to the charger control signal varies the second controlled switch impedance so that a regulated flow of charge is supplied to the battery.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
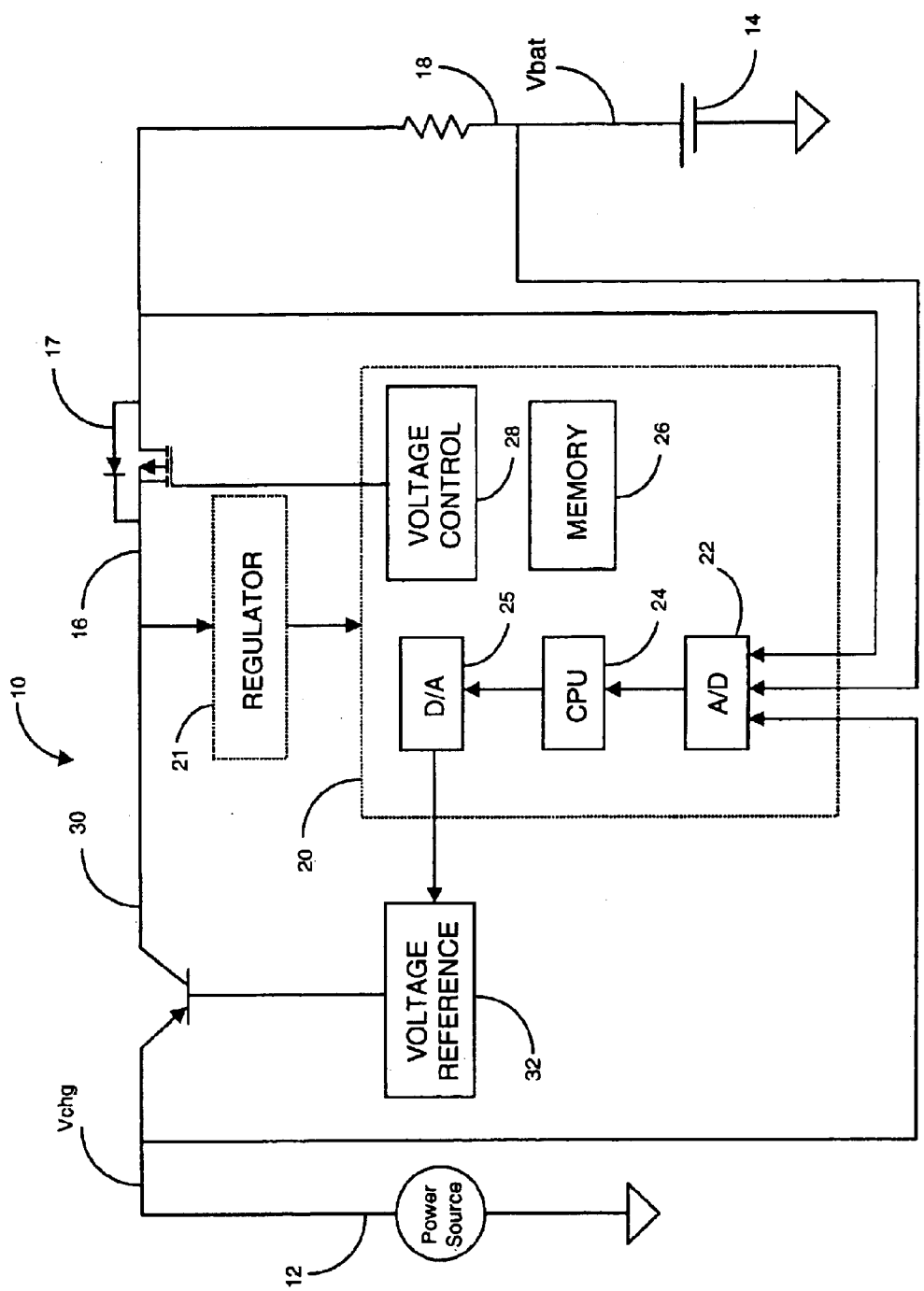
FIG. 1 illustrates a block diagram of an embodiment of a battery charger in accordance with the principles of the invention.

Referring to FIG. 1, a battery charger 10 in accordance with the principles of the invention is shown. The battery charger 10 includes a linear preregulator in combination with a charge control circuit to provide a charging current to a battery 14. The linear preregulator in combination with charge control circuit advantageously enable the battery charger 10 to operate regardless of the battery voltage. The battery charger 10 is able to continuously source voltage during input overvoltage conditions.

The battery charger 10 includes a preregulator switch 30 coupled to the power source 12. The preregulator switch 30 is operated as a linear regulator to generate a regulated output voltage, Vpr, from the power source 12, which is generated by varying its impedance. A voltage reference 32 coupled to a control input of the preregulator switch 30 sets the voltage level of Vpr. During start-up, Vpr is set to a first voltage level. After start-up, a preregulator control signal from the voltage reference 32 sets Vpr to a second voltage level that may be BE varied over a predetermined range of values. The preregulator switch is preferably a PNP transistor, however any controllable switch may be used such as an N-Channel MOSFETs, IGBTs, and NPN transistors. The voltage reference 32 may be ay well known reference circuit including a resistor divider connected to the power source 12 and a buffered voltage regulator diode.

A charge regulation circuit 16 is coupled between the preregulator switch 30 and the battery 14. The impedance of the charge circuit 16 is varied to control the flow of charging current from the preregulator switch 30 to the battery 14. A charge control signal coupled to a control input of the charge regulation circuit 16 controls the charging current. Increasing the impedance of the charge regulation circuit 16 causes a decrease in the flow of the charging current. Likewise, decreasing the impedance of the charge regulation circuit 16 causes an increase in the flow of the charging current. The charge regulation circuit 16 may be any controllable switch such as PNP and NPN transistors, MOSFETs, integrated gate bipolar transistors (MCTs).

A current sense circuit 18 connected in series with the battery 14 generates a current sense signal that is representative of the current flowing through the battery 14. Those skilled in the art will recognize that the current sense circuit 18 may also be connected in series with either the charge regulation circuit 16, preregulator switch 30, or the power source 12 to change the impact of errors in the current measurement caused by shunt currents flowing to peripheral circuits. The current sense circuit 18 may be any circuit for sensing current such as a resistor, a Hall effect device, and a magneto-resistive circuit.

A control circuit 20 generates the charge control signal and the preregulator control signal. The charge control signal varies the flow of charge to the battery 14 by controlling the charge switch 16. The preregulator control signal controls the voltage level of the voltage reference 32, which sets the level of the regulated output voltage. The regulated output voltage may be adjusted to split the dissipated power across the preregulator switch 30 and charge regulation circuit 16 in a controlled manner. For example, to split dissipated power equally, Vpr is set equal to (Vin+Vb)/2. Generally, the voltage level of Vpr is computed as follows:

$$Vpr=Vin*(1-Pd1)/(Vb*(1-Pd2))$$

Where Vin is the voltage from the power source 12, Vb is the battery voltage, Pd1 is the proportion (from 0 to 1) of power dissipated across the preregulator switch 30, and Pd2 is the proportion (from 0 to 1) of power dissipated across the charge regulation circuit 16. The scope of the invention also includes setting Vpr to a fixed value.

The control circuit 20 advantageously may receive power from either, the regulated output voltage or the battery 14, so that control of the preregulator switch 30 and charge regulation circuit 16 through the preregulator control and charge control signals is maintained with either low input voltage or low battery voltage. In addition, a regulator 21 may be coupled between the preregulator switch 30 and the control circuit 20 to provide independent regulation of the voltage supplying power to the control circuit 20.

Control of the charge control signal may be based on any known battery charging algorithm. However, the charge control signal is preferably based on a multi-mode control scheme in which the power dissipated across the charge regulation circuit 16 is limited to less than a predetermined level. A detailed description of the preferred control scheme is presented in a later section of this specification.

In one embodiment, the control circuit 20 is implemented in a digital circuit including an A/D 22, a CPU 24, a memory 25, a D/A 26, and a buffer 28. Those skilled in the art will recognize that the control circuit may also be implemented in other types of circuits such as mixed signal circuits.

The A/D 22 converts the sensed signals representing voltages and currents to digital signals to be processed by the CPU 24. The sensed signals include the current sense signal and the voltage signals representing the voltage from the power source 12 and the battery voltage.

The CPU 24 executes a series of instructions stored in the memory 26 to implement the control scheme and generate a digital control signal. The CPU 24 may be any known processor including uProcessors and uControllers.

The D/A 25 uses well known techniques to convert the digital control signal to an analog signal that is suitable for driving the charge regulation circuit 16. A voltage control 28 may optionally be coupled between the D/A 25 and the charge regulation circuit 16 to provide voltage level shifting or decreased source impedance to improve circuit response.

Figure 2:
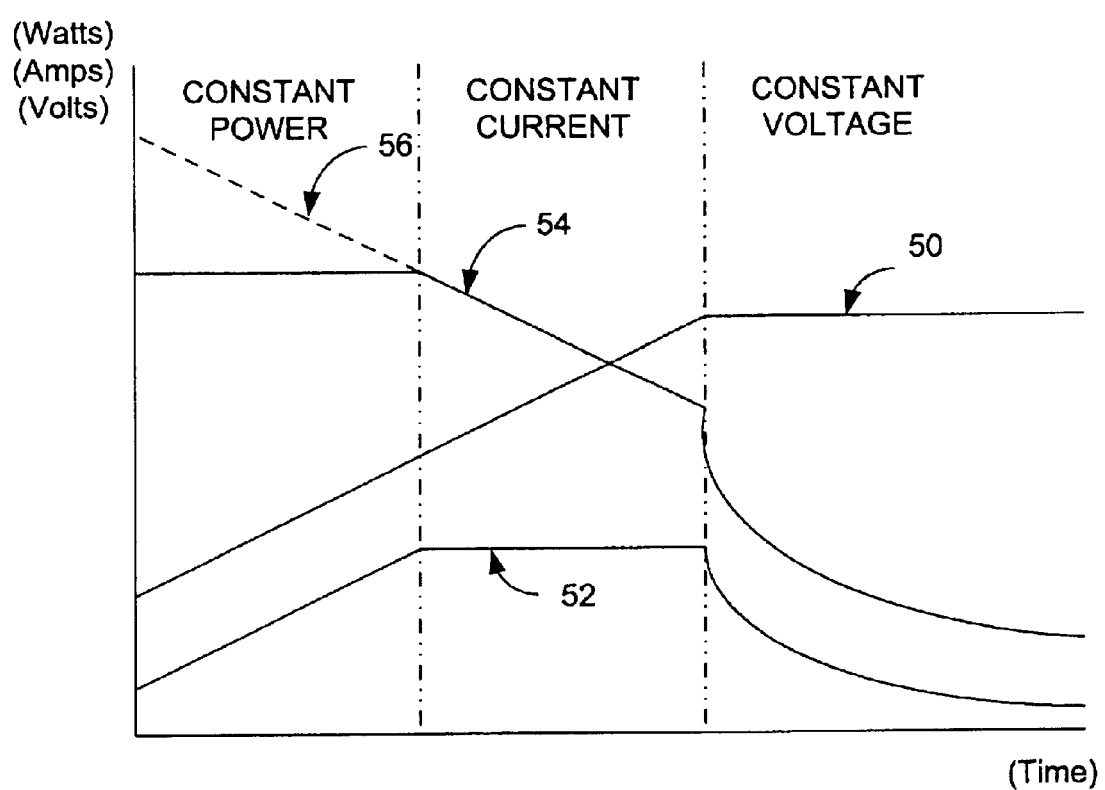
FIG. 2 illustrates waveforms corresponding to one embodiment of a battery charger in accordance with the principles of the invention.

Referring to FIG. 2, waveforms associated with one embodiment of the invention are shown. A first voltage waveform 50 shows the battery voltage increasing as the battery is charged from the discharged state to a charged state. The voltage across the charge switch 16 is approximately equal to the regulated output voltage minus the battery voltage (neglecting losses in the current sense circuit 18 and interconnect losses). When the battery voltage is at a minimum voltage, the voltage across the charge regulation circuit 16 is at a maximum, since the regulated output voltage is about constant. A current waveform 52 shows the current flowing through the battery 14. A power waveform 054 shows the power dissipated in the charge regulation circuit 16. The power dissipated is equal to the current flowing through the charge regulation circuit 16 times the voltage across the charge regulation circuit 16. A dashed waveform 56 illustrates the power that would be dissipated in the charge regulation circuit 16 if the charge current is held constant. As depicted by the waveforms 50–54, there are three operating modes in the illustrated embodiment; a constant power mode followed by a constant current mode and a constant voltage mode.

During constant power mode the power dissipated in the charge regulation circuit 16 is limited to a predetermined power level such as the maximum allowed dissipation in the charge regulation circuit 16 or a lower power level at which heating of the battery charger 10 is reduced to enhance user comfort when the battery charger 10 is included in an assembly such as a wireless device. The charger switch power dissipation is limited by operating the charge regulation circuit 16 in the active region to vary the impedance in series with the power source 12 and battery 14, which controls the flow of current to the battery 14. When the power dissipated in the charge regulation circuit 16 decreases to less than the predetermined power level, the battery charger 10 shifts to constant current mode.

During constant current mode, the current flowing through the battery 14 is limited to a predetermined maximum current level that is a function of the battery charge characteristics such as ambient temperature, battery size, and battery type. Once the battery voltage increases to the steady-state voltage level, the battery charger 10 shifts to constant voltage mode.

During constant voltage mode, the amount of charge current is controlled to maintain a relatively constant voltage across the battery 14. The battery charger 10 remains in constant voltage mode as long as the battery 14 is attached or until a load is impressed on the battery 14 causing the battery voltage to decrease to less than the steady-state voltage.

Figure 3:
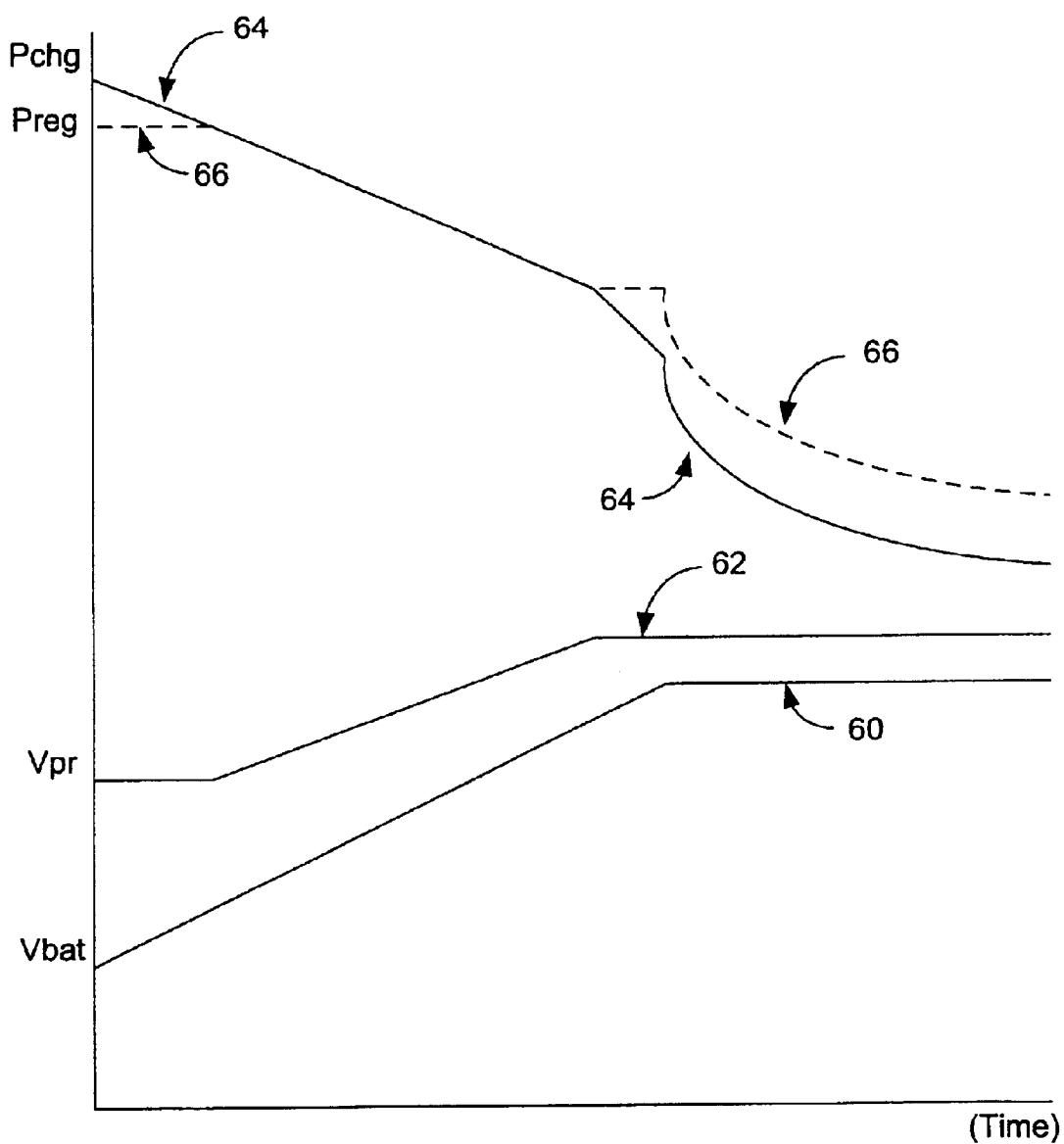
FIG. 3 illustrates waveforms corresponding to another embodiment of a battery charger in accordance with the principles of the invention.

Referring to FIG. 3, waveforms associated with a second embodiment of the invention are shown. A second voltage waveform 60 shows the battery voltage increasing as the battery is charged from the discharged state to a charged state. A third voltage waveform 62 shows the regulated output voltage initially limited to a predetermined minimum voltage, then linearly increasing as the battery voltage increases, until the regulated output voltage is limited to a predetermined maximum voltage.

A second power waveform 64, Pchg, shows the power dissipated in the charge regulation circuit 16. A third power waveform 66, Preg, shows the power dissipated in the preregulator switch 30. In the second embodiment, the regulated output voltage is adjusted so that the power dissipation of the preregulator switch 30 and the charge regulation circuit 16 are approximately equal over a major portion of the operating range. The control techniques of the second embodiment may also be combined with the control techniques of the first embodiment to increase the operating range over which the power dissipation of the preregulator switch 30 and the charge regulation circuit 16 are controllable.

Figure 4:
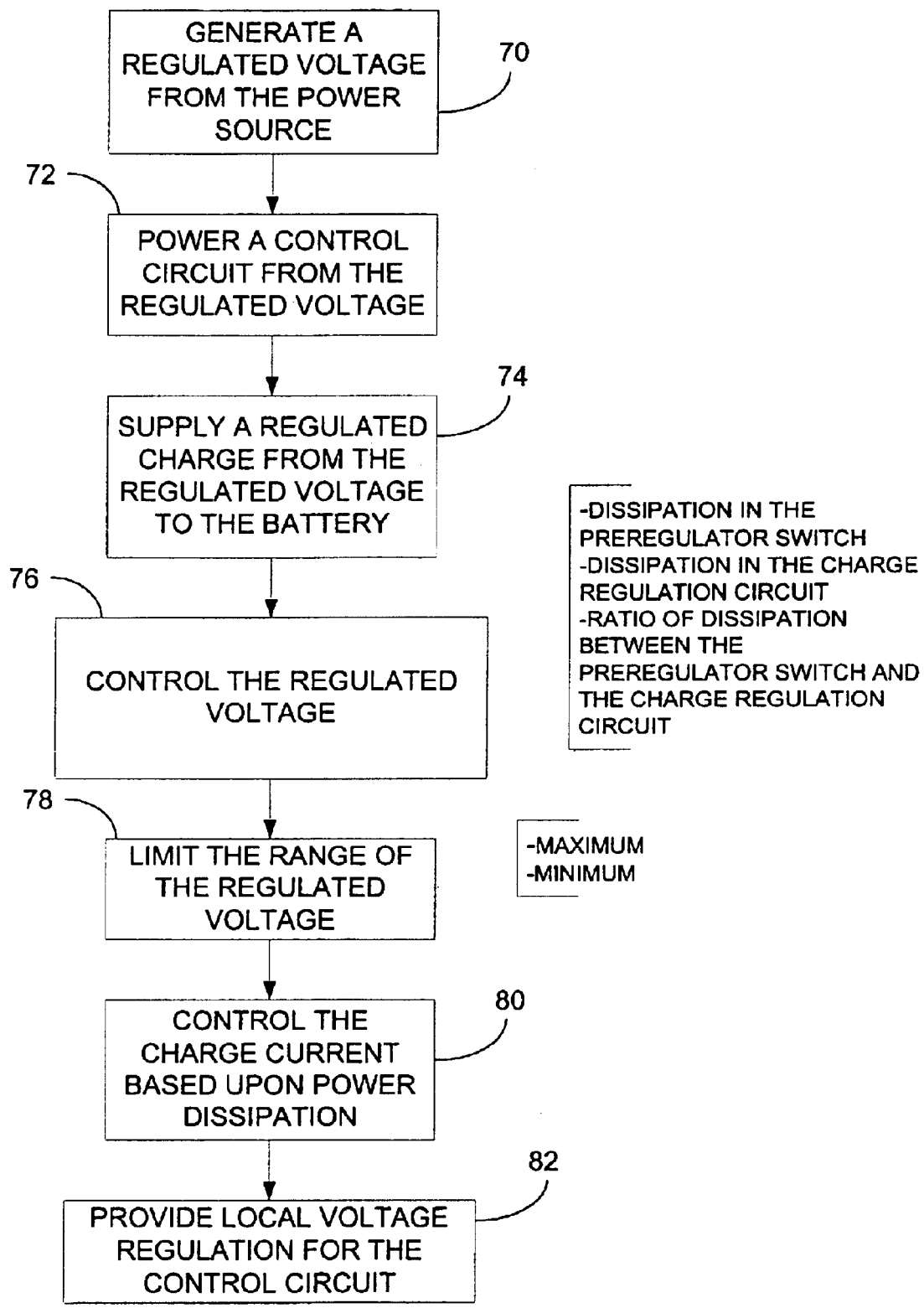
FIG. 4 illustrates a first flow diagram of a method of charging a battery in accordance with the principles of the invention.

Referring to FIG. 4, an operating process of an embodiment of the invention is shown. Beginning at state 70, a regulated output is generated from the power source 12. The voltage level of the regulated output is set by either the voltage reference 32 or, if the control circuit 20 is powered from the battery 14, the preregulator control signal.

Continuing on to state 72, the control circuit 20 receives power from the regulated output. At state 74, the control circuit controls a flow of charge from the regulated output to the battery 14, which charges the battery 14. As charge flows from the power source 12, through the preregulator switch 30 to the battery 12, power is dissipated in the preregulator switch 30 and the charge regulation circuit 16. The total dissipated power in the battery charger 10 is a function of Vin, Vbat, and Ichg. While, how the dissipated power is split between the preregulator switch 30 and the charge regulation circuit 16 is a function of the regulated output voltage level, Vpr. By increasing the regulated output voltage level, the power dissipation of the preregulator switch 30 decreases, while the power dissipation in the charge regulation circuit 16 increases. At state 76, the regulated output is controlled as a function of power dissipation within the battery charger 10. The control schemes include maintaining constant power dissipation in either the preregulator switch 30 or the charge regulation circuit 16, and maintaining a constant ratio of power dissipation between the preregulator switch 30 and the charge regulator switch 16. At state 78, the regulated output is limited to maximum voltage level and a minimum voltage level to, for example, limit the voltage level of power to within the operating range of the control circuit 20.

During state 82, the charge current is controlled to provide a flow of energy to the battery 14. Schemes for controlling the current include constant current charging, constant voltage charging, and constant power charging.

Figure 5:
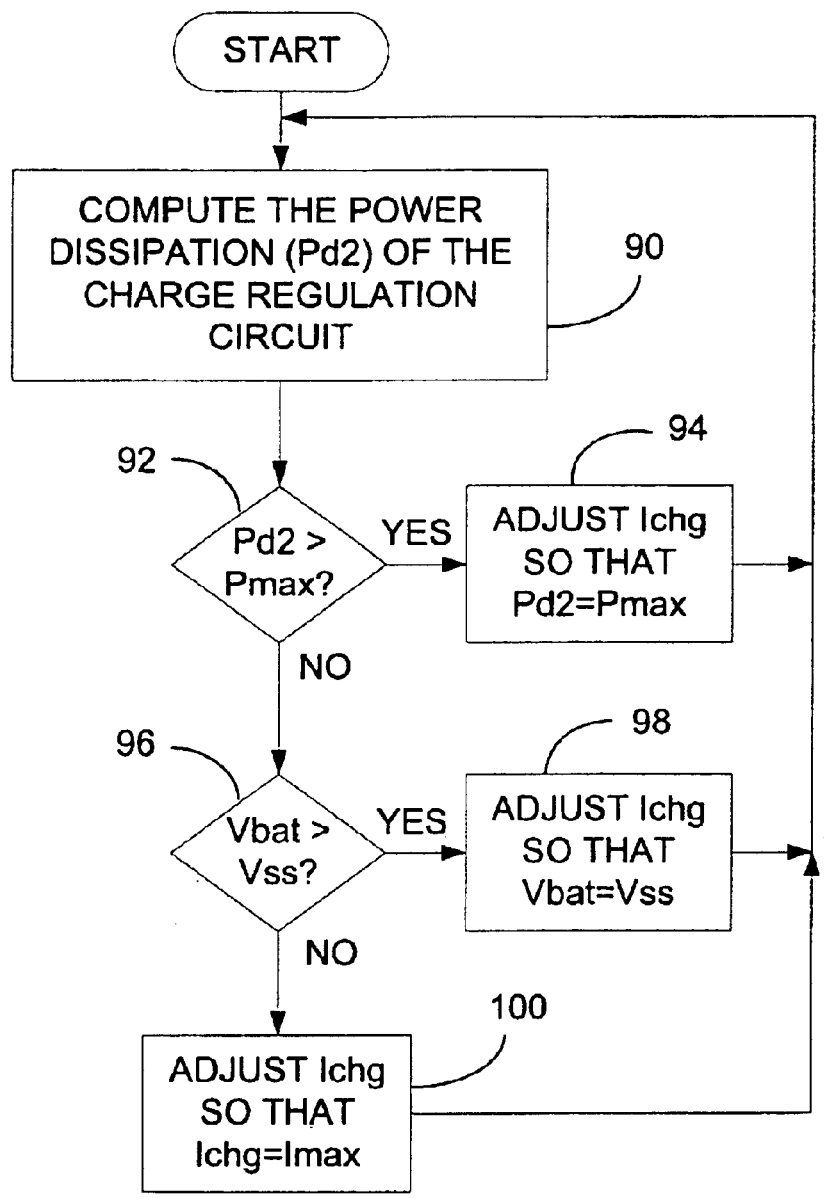
FIG. 5 illustrates a second flow diagram of a method of charging a battery in accordance with the principles of the invention.

Referring to FIG. 5, constant power charging is shown. Initially at state 90, the approximate power dissipation, Pd2, of the charge regulation circuit 16 is computed from the battery current and Vpr minus Vbat. Continuing on to state 92, the computed power dissipation is compared to the predetermined maximum power dissipation level. It the computed power dissipation is greater than Pmax, the battery charger 10 operates in constant power mode. In constant power mode, the process proceeds to state 94 where the charging current, Ichg, is adjusted so that Pd2 approximately equals Pmax. The process then returns to state 90 to again compute the power dissipation in the charge regulation circuit 16. The process remains in the constant power mode loop until Pd2 is less than Pmax.

Returning to state 92, when Pd2 is less than the predetermined maximum power dissipation level, the process continues on to state 96. At state 96 the battery voltage, Vbat, is compared to the predetermined steady-state voltage level, Vss. If the battery voltage is greater than Vss, the battery charger 10 operates in constant voltage mode. In constant voltage mode, the process continues on to state 98, in which the charging current, Ichg, is adjusted so that Vbat approximately equals Vss. The process then returns to state 90 to again compute the power dissipation in the charge regulation circuit 16. The process remains in constant voltage looping through states 90, 92, 96, and 98 until Vbat is less than Vss.

Returning to state 96, if Vbat is less than Vss, the battery charger 10 operates in the constant current mode. In constant current mode, the process continues on to state 100. In state 100 the charging current is controlled to be approximately equal to the predetermined maximum charging current, Imax. The process remains in constant current, looping through steps 90, 92, 96, and 100 until either the Pd2 is greater than Pmax, or Vbat is greater than Vss.

A number of embodiments of the invention have been described. Nevertheless, it will be understood that various modifications may be made without departing from the spirit and scope of the invention. In particular, those skilled in the art will recognize that the steps of the process may be interchanged as well as executed in parallel. Accordingly, other embodiments are within the scope of the following claims.

What is claimed is:

1. A battery charger for charging a battery from a power source, comprising:

a current sense circuit connected in series with power source and the battery;

a voltage reference circuit to generate a first control signal in response to a preregulator control signal;

a preregulator switch having an impedance, coupled to the power source to generate a regulated output, the preregulator switch being responsive to the first control signal, to vary said impedance thereof such that the regulated output is generated;

a control circuit coupled to the preregulator switch, the control circuit to generate the preregulator control signal and a charge control signal; and a charge regulation circuit having an impedance, responsive to the charger control signal, to vary the controlled switch impedance so that a regulated flow of charge is supplied to the battery, wherein the control circuit includes at least two operating modes;

during a first mode of the at least two operating modes, the control circuit controls the preregulator switch, through the voltage reference circuit, such that the regulated output increases as a voltage across the battery increases; and during a second mode of the at least two operating modes, the control circuit limits the regulated output in a constant level.

2. The battery charger of claim 1, wherein the current sense circuit is composed of a resistor.

3. The battery charger of claim 1, wherein the preregulator switch is selected from the group of PNP transistors and N-channel MOSFETs.

4. The battery charger of claim 1, wherein the charge regulation circuit is composed of a switch, said switch is selected from the group of PNP transistors and N-channel MOSFETs.

5. The battery charger of claim 1, wherein the control circuit includes:

an A/D to digitize current sense signal;

a CPU to generate a digital control signal computed form the digitized current sense signal; and a D/A to convert the digital control signal to the charge control signal.

6. The battery charger of claim 5, included within a wireless device.

7. The battery charger of claim 6, wherein the wireless device is a cell.

8. A method of charging a battery from a power source, comprising:

providing a first controlled impedance, caused by a first regulating element, in series with the power source;

linearly controlling the first controlled impedance so that a regulated output having a first voltage level is generated;

supplying power from the regulated output to a control circuit;

the control circuit generating a preregulator control signal operable to adjust the regulated output to a second voltage level;

providing a second controlled impedance, caused by a second regulating element, coupled between the regulated output and the battery;

controlling the first controlled impedance so that the regulated output is varied from the first voltage level to the second voltage level in response to said preregulator control signal; and controlling the second controlled impedance so that a charging current is supplied to the battery.

9. The method of claim 8, wherein power dissipation in the second controlled impedance and power dissipation in the first controlled impedance is a function of the regulated output.

10. The method of claim 8, further comprising limiting the second voltage level to less than a maximum voltage.

11. The method of claim 8, further comprising controlling the charging current as a function of the power dissipation in the second controlled impedance.

12. The method of claim 8, further comprising adjusting the second voltage level such that the power dissipation in the second controlled impedance is approximately equal to the power dissipation in the first controlled impedance.

13. The method of claim 12, further comprising limiting the second voltage level to less than a maximum voltage.

14. A battery charger for charging a battery from a power source, comprising:

a preregulator switch having an impedance, coupled to the power source to generate a regulated output;

a current sense circuit coupled in series with the battery to generate a current sense signal representative of battery current;

a controllable voltage reference coupled to the preregulator switch to vary a voltage level of the regulated output responsive to a preregulator control signal, the controllable voltage reference having a first state and a second state;

a charge regulation circuit having a series impedance coupled between the preregulator switch and the battery, the charge regulation circuit, responsive to a charge control signal, to vary the series impedance so that a charging current is supplied to the battery;

a control circuit powered by the regulated output, the control circuit to generate the preregulator control signal and the charge control signal;

the preregulator control signal generated as a function of power dissipation in the impedance of the preregulator switch and power dissipation in the series impedance of the charge regulation circuit; and the charge control signal generated as a function of the battery current and the power dissipation in the charge regulation circuit.

* * * * *